US012700627B2

(12) United States Patent
Jung et al.

(10) Patent No.: US 12,700,627 B2
(45) Date of Patent: Aug. 4, 2026

(54) BATTERY MODULE AND BATTERY PACK INCLUDING THE SAME

(71) Applicant: LG Energy Solution, Ltd., Seoul (KR)

(72) Inventors: Hyemi Jung, Daejeon (KR); Junyeob Seong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 715 days.

(21) Appl. No.: 18/008,111

(22) PCT Filed: Jan. 13, 2022

(86) PCT No.: PCT/KR2022/000663
§ 371 (c)(1),
(2) Date: Dec. 2, 2022

(87) PCT Pub. No.: WO2022/158793
PCT Pub. Date: Jul. 28, 2022

(65) Prior Publication Data
US 2023/0282901 A1 Sep. 7, 2023

(30) Foreign Application Priority Data
Jan. 22, 2021 (KR) ........................ 10-2021-0009236

(51) Int. Cl.
*H01M 10/653* (2014.01)
*H01M 10/615* (2014.01)
(Continued)

(52) U.S. Cl.
CPC ....... *H01M 10/653* (2015.04); *H01M 10/615* (2015.04); *H01M 10/637* (2015.04);
(Continued)

(58) Field of Classification Search
CPC ............. H01M 10/653; H01M 10/615; H01M 10/637; H01M 10/6553; H01M 50/211; H01M 50/507; H01M 2220/20
(Continued)

(56) References Cited

U.S. PATENT DOCUMENTS

2009/0311574 A1* 12/2009 Lee ................... H01M 8/04268
429/479
2012/0280692 A1 11/2012 Park
(Continued)

FOREIGN PATENT DOCUMENTS

CN 103283062 A 9/2013
EP 3930080 A1 12/2021
(Continued)

OTHER PUBLICATIONS

Extended European Search Report for EP Application No. 22742769.7 dated Jun. 24, 2024.

*Primary Examiner* — Allison Bourke
*Assistant Examiner* — Robert Gene West
(74) *Attorney, Agent, or Firm* — Bryan Cave Leighton Paisner LLP

(57) ABSTRACT

A battery module including a battery cell stack in which a plurality of battery cells are stacked; a housing for the battery cell stack; a pair of busbar frames that cover the front and rear surfaces of the battery cell stack; and a pair of end plates that cover the busbar frames and are coupled to the housing, a busbar mounted on each of the busbar frames, and a thin film layer located between the busbar frame and the respective end plate.

9 Claims, 5 Drawing Sheets

(51) Int. Cl.
    *H01M 10/637*     (2014.01)
    *H01M 10/6553*     (2014.01)
    *H01M 50/211*     (2021.01)
    *H01M 50/507*     (2021.01)

(52) U.S. Cl.
    CPC ..... *H01M 10/6553* (2015.04); *H01M 50/211*
        (2021.01); *H01M 50/507* (2021.01); *H01M*
        *2220/20* (2013.01)

(58) Field of Classification Search
    USPC ........................................................ 429/120
    See application file for complete search history.

(56)            References Cited

U.S. PATENT DOCUMENTS

| 2014/0085044 A1 | 3/2014 | Hirose |
| 2021/0273267 A1 | 9/2021 | Yoon et al. |

| 2021/0336287 A1 | | 10/2021 | Kim et al. |
| 2021/0344074 A1 | * | 11/2021 | Jung ................... H01M 50/209 |
| 2022/0166080 A1 | | 5/2022 | Choi et al. |

FOREIGN PATENT DOCUMENTS

| JP | 2009118729 A | * | 5/2009 |
| JP | 2010067386 A | | 3/2010 |
| JP | 2010-097923 A | | 4/2010 |
| JP | 2011-023179 A | | 2/2011 |
| JP | 2012069281 A | * | 4/2012 |
| JP | 5644940 B2 | | 12/2014 |
| KR | 10-2009-0077418 A | | 7/2009 |
| KR | 10-2009-0130453 A | | 12/2009 |
| KR | 10-2016-0006000 A | | 1/2016 |
| KR | 10-1614434 B1 | | 5/2016 |
| KR | 10-2101645 B1 | | 4/2020 |
| KR | 10-2020-0086170 A | | 7/2020 |
| KR | 10-2020-0104143 A | | 9/2020 |
| KR | 10-2020-0144422 A | | 12/2020 |

* cited by examiner

【FIG. 1】
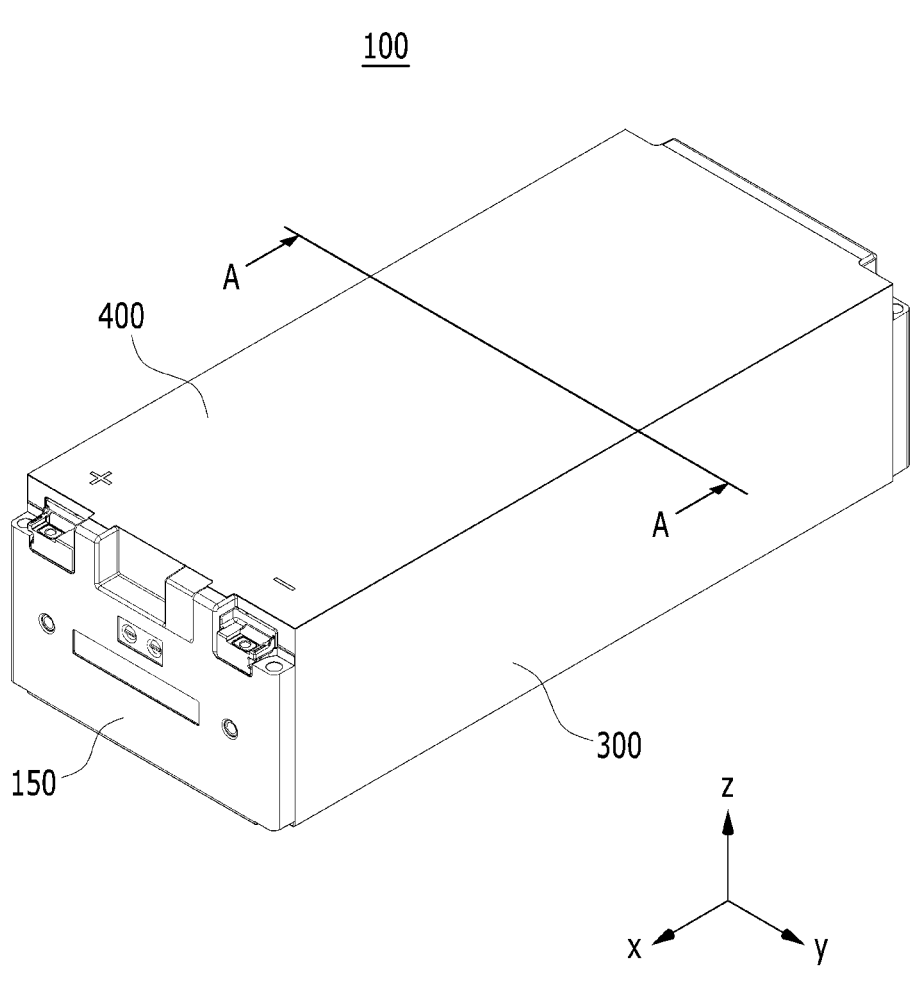

【FIG. 2】
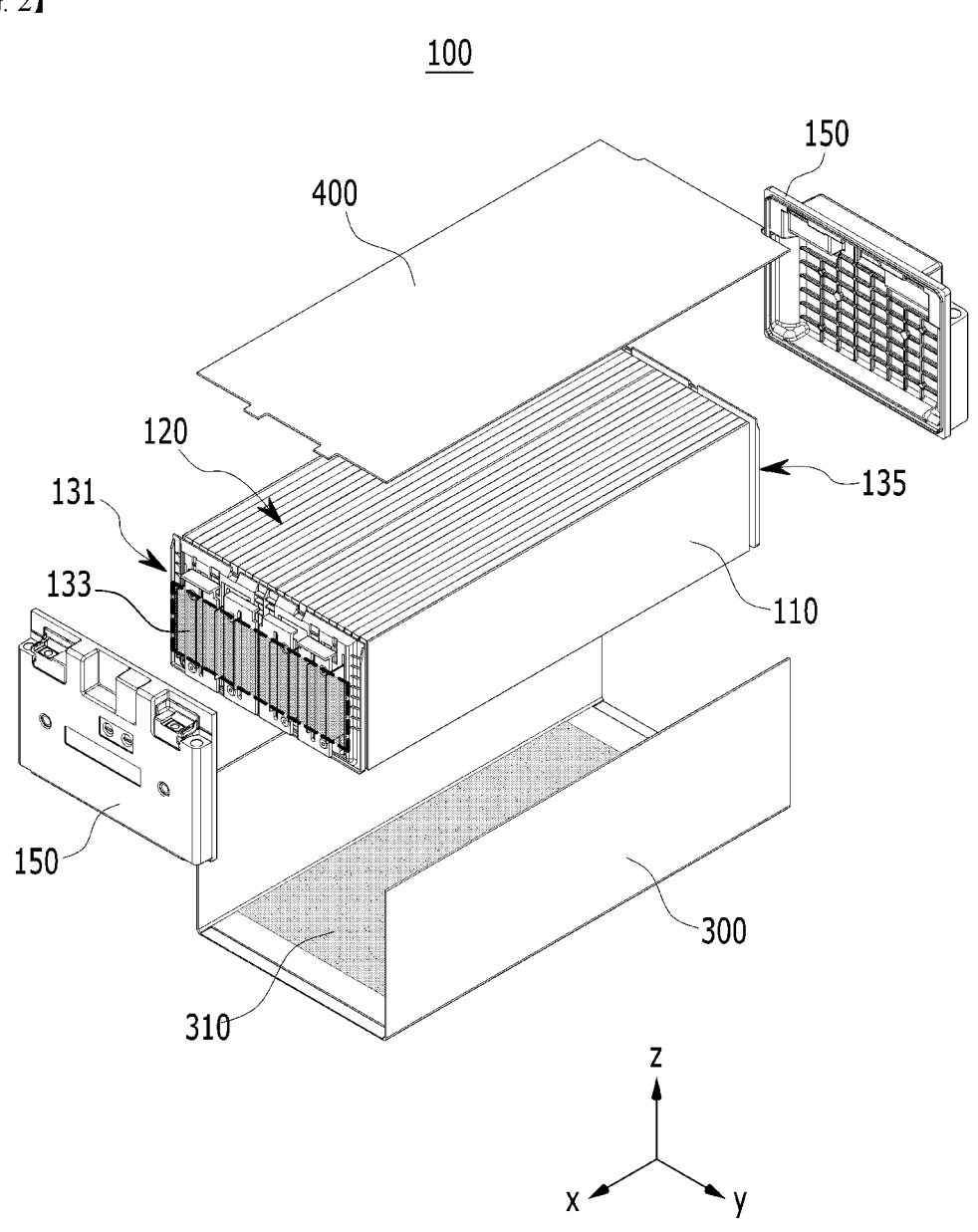

【FIG. 3A】
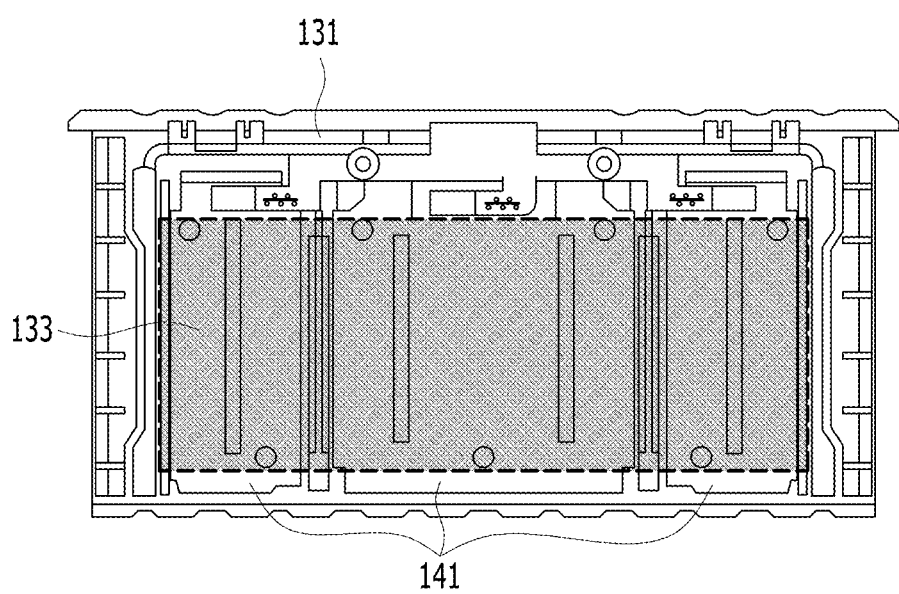
【FIG. 3B】
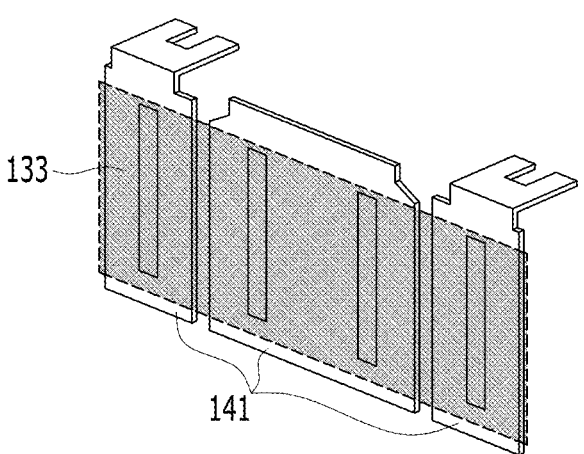

【FIG. 4A】
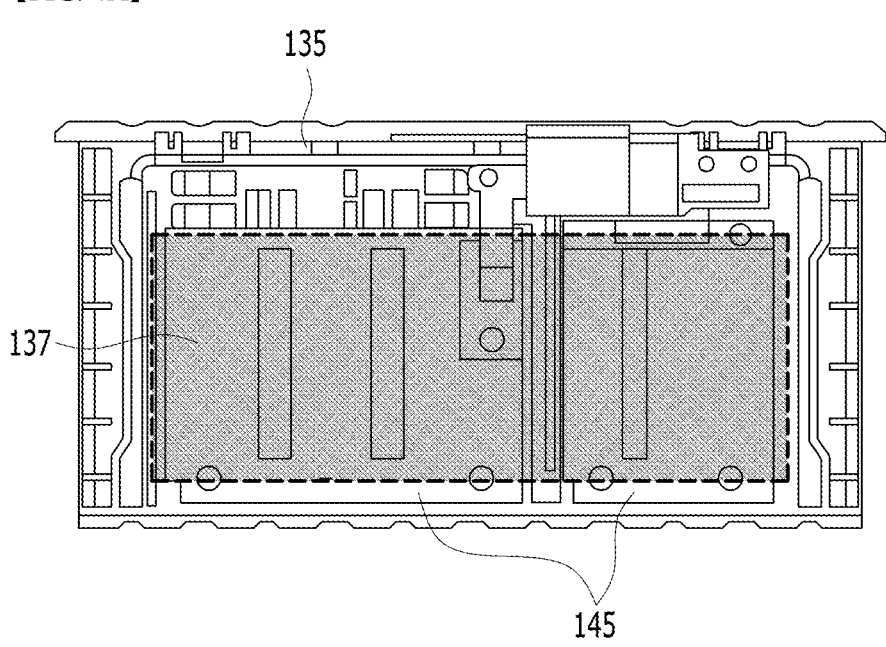
【FIG. 4B】
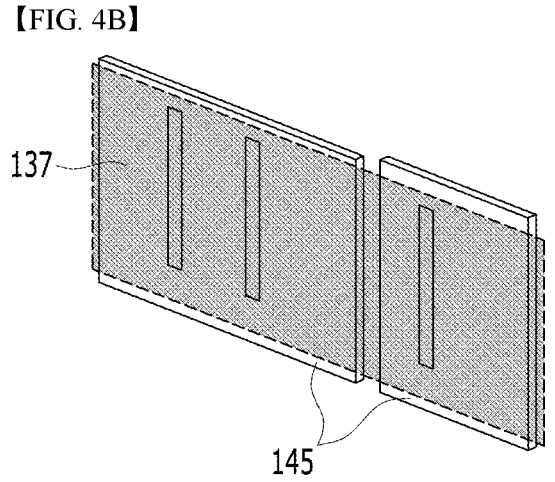

【FIG. 5】
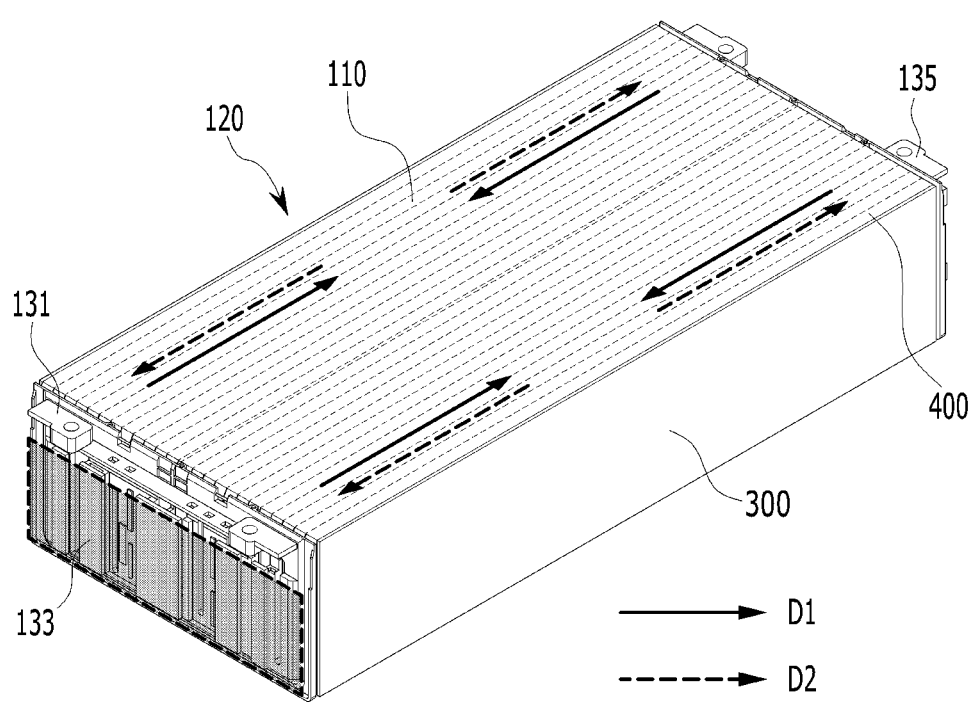

BATTERY MODULE AND BATTERY PACK INCLUDING THE SAME

CROSS-REFERENCE TO RELATED APPLICATIONS

This application is a US national phase of international application No. PCT/KR2022/000663 filed on Jan. 13, 2022, and claims the benefit of Korean Patent Application No. 10-2021-0009236 filed on Jan. 22, 2021, the contents of which are incorporated herein by reference in their entirety.

TECHNICAL FIELD

The present disclosure relates to a battery module and a battery pack including the same, and more particularly to a battery module in which heat inside the battery module is automatically managed and controlled according to the temperature of the external environment, and a battery pack including the same.

BACKGROUND

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas medium- or large-sized devices such as vehicles require high power and large capacity. Therefore, a medium- or large-sized battery module having a plurality of battery cells electrically connected to one another is used.

Here, there are problems that the output performance of the battery module deteriorates with increasing exposure to a low-temperature environment. As an example, in the case of a vehicle equipped with a battery module, there is a problem that the battery performance deteriorates in a cold start environment. Some battery modules have an indirect heating device such as a planar heating element, inserted or disposed within the battery module, to solve these problems. However, this has a technical disadvantage of increasing the thickness and weight of the entire battery module, and has economic drawbacks such as an increase in manufacturing cost due to the addition of a separate control means for controlling the planar heating element. Thereby, there is a need to develop a battery module that can eliminate technical or economic drawbacks while preventing a decrease in the output of the battery module even in a low-temperature environment.

SUMMARY

It is an objective of the present disclosure to provide a battery module in which heat inside the battery module is automatically managed and controlled according to the temperature of the external environment, and a battery pack including the same.

The objectives of the present disclosure are not limited to the aforementioned objects, and other objectives which are not described herein should be clearly understood by those skilled in the art from the following detailed description and the accompanying drawings.

According to one aspect of the present disclosure, there is provided a battery module comprising: a battery cell stack in which a plurality of battery cells are stacked; a housing that houses the battery cell stack; a pair of busbar frames that cover the front and rear surfaces of the battery cell stack; and a pair of end plates that cover the busbar frame and is coupled to the housing, wherein a busbar is mounted on the busbar frame, and wherein a thin film layer is located between the busbar frame and the end plate.

The thin film layer may be in contact with at least a part of a surface of the busbar.

The thin film layer may include a thin film composition that generates heat at a first temperature.

The first temperature may be a temperature of 10 degrees Celsius or less.

The thin film composition may include a CTR (Critical Temperature Resistor) ceramic material.

The CTR (Critical Temperature Resistor) ceramic material may include at least one of a composite vanadium oxide-based material, a boron oxide-based material, and a phosphoric acid-based material.

The composite vanadium oxide-based material may be selected from at least one of $VO_2$, $V_2O_3$, and $V_6O_{13}$.

The thin film composition may further include a doping material.

The doping material may include at least one of $Mo^{4+}$, $Mo^{5+}$, $Mo^{6+}$, $W^{5+}$, $W^{6+}$, and $Nb^{5+}$.

The thin film composition containing the doping material may generate heat at a second temperature, and the second temperature may be lower than the first temperature.

According to another aspect of the present disclosure, there is provided a battery pack comprising the above-mentioned battery module.

According to embodiments of the present disclosure, the battery module and the battery pack including the same can automatically manage and control heat inside the battery module according to the temperature of an external environment, by including a thin film layer that is heated to an appropriate temperature level in a low-temperature environment.

The effects of the present disclosure are not limited to the effects mentioned above and additional other effects not described above will be clearly understood from the detailed description and the accompanying drawings by those skilled in the art.

BRIEF DESCRIPTION OF THE DRAWINGS

FIG. 1 is a perspective view of a battery module according to an embodiment of the present disclosure;

FIG. 2 is an exploded perspective view of the battery module of FIG. 1;

FIGS. 3A-3B are illustrations of a busbar frame located on one surface of the battery cell stack of FIG. 2;

FIGS. 4A-4B are illustrations of a busbar frame located on the other surface of the battery cell stack of FIG. 2; and FIG. 5 is an illustration of a heat transfer path when the end plate is removed from the battery module of FIG. 1.

DETAILED DESCRIPTION

Hereinafter, various embodiments of the present disclosure will be described in detail with reference to the accompanying drawings so that those skilled in the art can easily carry out the embodiments. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, a battery module according to an embodiment of the present disclosure will be described. However, the description herein is made by referring to the front surface of the front and rear surfaces of the battery module, without being necessarily limited thereto, and even in the case of the rear surface, a description may be given with same or similar contents.

FIG. 1 is a perspective view of a battery module according to an embodiment of the present disclosure. FIG. 2 is an exploded perspective view of the battery module of FIG. 1.

As illustrated in FIGS. 1 and 2, a battery module 100 according to an embodiment of the present disclosure includes a battery cell stack 120 in which a plurality of battery cells 110 are stacked; housing parts 300 and 400 that house the battery cell stack 120; a pair of busbar frames 131 and 135 that cover the front and rear surfaces of the battery cell stack 120, respectively; and a pair of end plates 150 that cover the busbar frames 131 and 135 and is coupled to the housing parts 300 and 400.

Here, the housing parts 300 and 400 may include a U-shaped frame 300 that is open at its upper, front and rear surfaces and includes a bottom part and a side part, and an upper plate 400 that covers the upper part of the battery cell stack 120. However, the housing parts 300 and 400 are not limited thereto and can be replaced by a frame of another shape, such as an L-shaped frame or a mono frame surrounding the battery cell stack 120 excluding front and rear surfaces thereof.

As illustrated in FIG. 2, a thermal conductive resin layer 310 may be formed on the bottom surface of the U-shaped frame 300 in contact with the lower surface of the battery cell stack 120. Here, the thermal conductive resin layer 310 may be formed by applying a thermal conductive resin to the bottom surface of the U-shaped frame 300. That is, before the battery cell stack 120 is mounted on the U-shaped frame 300, the thermal conductive resin layer 310 can be formed by curing the previously applied thermal conductive resin. However, in the battery module 100 according to another embodiment of the present disclosure, the thermal conductive resin layer 310 may be omitted if necessary.

As the thermal conductive resin is cured, the lower surface of the battery cell stack 120 and the U-shaped frame 300 may be stably fixed to each other. In addition, the thermal conductive resin layer 310 can transfer heat from the battery cell stack 120 to the outside to cool the battery cell stack 120.

The battery cell stack 120 housed in the housing parts 300 and 400 is formed by staking a plurality of battery cells 110, wherein the battery cell 110 is preferably a pouch-type battery cell.

The battery cell 110 can be manufactured by housing the electrode assembly in a pouch of a laminated sheet containing a resin layer and a metal layer, and then heat-sealing a sealing part of the pouch case. A plurality of such battery cells 110 may be used, and the plurality of battery cells 110 can form a battery cell stack 120 that is stacked to be electrically connected to each other.

Next, the busbar frames 131 and 135 will be described in detail.

FIGS. 3A-3B show a busbar frame located on one surface of the battery cell stack of FIG. 2. FIGS. 4A-4B show a busbar frame located on the other surface of the battery cell stack of FIG. 2.

As illustrated in FIGS. 2, 3A-3B and 4A-4B, at least one busbar 141 and 145 may be mounted on the busbar frames 131 and 135, respectively. Here, the busbars 141 and 145 electrically connect the electrode leads of the battery cell stack 120 protruding from the busbar frames 131 and 135, respectively, so that the battery cell stack 120 stacked in parallel can be electrically connected.

As an example, the busbar frames 131 and 135 may include a first busbar frame 131 and a second busbar frame 135. Here, the first busbar frame 131 may be located on the front surface of the battery cell stack 120, and the second busbar frame 135 may be located on the rear surface of the battery cell stack. Further, the busbars 141 and 145 may include a first busbar 141 and a second busbar 145. Here, the first busbar 141 may be mounted on the first busbar frame 131, and the second busbar 145 may be mounted on the second busbar frame 135. However, here, even if the positions of the first busbar frame 131 and the second busbar frame 135 are changed from each other, it may be explained similarly.

Further, the thin film layers 133 and 137 are located between the busbar frames 131 and 135 and the end plate 150, respectively. More specifically, a first thin film layer 133 may be located between the first busbar frame 131 and the end plate 150, and a second thin film layer 135 may be located between the second busbar frame 135 and the end plate 150. However, here, in the battery module according to another embodiment of the present disclosure, a part of the first thin film layer 133 and the second thin film layer 137 may be omitted.

Further, as illustrated in FIGS. 3A-4B, the thin film layers 133 and 137 may be in contact with at least a part of the surfaces of the busbars 141 and 145 or may be coated on at least a part of the surfaces of the busbars 141 and 145. More specifically, the first thin film layer 133 may be in contact with at least a part of the surface of the first busbar 141 or may be coated on at least a part of the surface of the first busbar 141. Further, the second thin film layer 137 may be in contact with at least a part of the surface of the second busbar 145 or may be coated on at least a part of the surface of the second busbar 145.

Thereby, in the battery module 100 according to the present embodiment, the thin film layers 133 and 137 are in direct contact with the busbars 141 and 145, respectively, so that the battery cell 110 can be heated via the busbars 141 and 145 in a low-temperature environment, can prevent a decrease in the output of the battery cell 110 that may occur in a low-temperature environment, and can improve battery performance. Further, heat may be transferred to the outside from the battery cell 110 in a room temperature or high temperature environment, thereby preventing the battery cell 110 from being excessively heated.

As an example, the thin film layers 133 and 137 are previously fabricated in the form of a film or sheet so that they can be attached to the busbars 141 and 145. Here, the thin film layers 133 and 137 can be attached to the busbars 141 and 145, respectively, by their own adhesive force, or a separate adhesive layer may be formed and attached between the thin film layers 133 and 137 and the busbars 141 and 145, respectively. As another example, the thin film layers 133 and 137 can be formed by being applied or coated on the surfaces of the busbars 141 and 145, respectively. More specifically, the thin film layers 133 and 137 can be coated and formed on the surfaces of the busbars 141 and 145, respectively, through a conventional thin film coating process such as sol-gel, ALD (atomic-layer-deposition), CVE (chemical vapor deposition), and PVD (physical vapor deposition). However, the present disclosure is not limited thereto, and the thin film layers 133 and 137 can be formed in various shapes.

The battery module 100 according to the present embodiment includes the thin film layers 133 and 137, so that the manufacturing process can be simplified and the manufacturing cost can be reduced, without increasing the weight or thickness of the battery module 100.

Further, the thin film layers 133 and 137 may be formed of a thin film composition that generates heat at the first temperature. More specifically, the thin film layers 133 and 137 generates heat at the first temperature, wherein the heat generated in the thin film layers 133 and 137 is transferred to the battery cell 110 via the busbars 141 and 145, respectively, so that the battery cell 110 can be heated to 20 to 50 degrees Celsius.

Here, the first temperature may be a temperature of 10 degrees Celsius or less. More specifically, the first temperature may be a temperature of 5 degrees Celsius or less. In one example, the first temperature may be a temperature of 0 degrees Celsius or less.

Therefore, the thin film layers 133 and 137 may generate heat at a temperature within the above-mentioned range, and heat can be transferred to the battery cell 110 via the busbars 141 and 145 in contact with the thin film layers 133 and 137, respectively. Thus, in a low temperature environment such as the above-mentioned range, the battery cell 110 can be rapidly heated to a predetermined temperature by itself without inputting external thermal energy. Consequently, it is possible to prevent a decrease in the output of the battery cell 110 in a low-temperature environment, and improve battery performance.

When the thin film layers 133 and 137 generate heat at a temperature greater than 10 degrees Celsius, heat generated can be transferred from the thin film layers 133 and 137 to the battery cell 110 even though the battery cell 110 is not exposed to a low-temperature environment to the extent that the output is lowered, whereby there is a risk that the battery cell 110 is excessively heated. In this case, an ignition phenomenon may occur in the battery cell 110.

To prevent this, the thin film composition of the thin film layers 133 and 137 may comprise a variable resistance heating element material having temperature dependency. More specifically, the thin film composition may comprise a material having a high electrical resistance at low temperatures and having a low electrical resistance at a high temperature. That is, the heat generated in the thin film layers 133 and 137 may be a resistance heat of the thin film composition.

Therefore, when the thin film layers 133 and 137 are exposed to a room temperature or high temperature environment, the thin film layers 133 and 137 do not generate heat, and the electrical resistance of the thin film layers 133 and 137 may be kept low at a level of the busbar energizing material. In other words, when the thin film layers 133 and 137 are not exposed in a low temperature environment to the extent that the output of the battery cell 110 is reduced, the heat energy supply/transfer due to the resistance heat of the thin film layers 133 and 137 can be restricted. In such a case, the thermal conductive resin layer 310 on the bottom surface of the above-mentioned U-shaped frame 300 can perform a cooling function for the battery cell 110.

In one example, the thin film composition may comprise a CTR (Critical Temperature Resistor) ceramic material. More specifically, the CTR (Critical Temperature Resistor) ceramic material has a property of rapidly changing electrical resistance due to a change in a crystal structure near a phase transition temperature. The CTR (Critical Temperature Resistor) ceramic material may include at least one of a composite vanadium oxide-based material, a boron oxide-based material, and a phosphoric acid-based material. In one example, the composite vanadium oxide-based material may be selected from at least one of $VO_2$, $V_2O_3$, and $V_6O_{13}$. Further, the boron oxide-based material may be $B_2O_3$. Further, the phosphoric acid-based material may be $P_2O_5$.

In the battery module 100 according to the present embodiment, the thin film layers 133 and 137 can function as a self-heating heating source in the battery module 100 due to high resistance heat at low temperatures and can function as an electrical conductor due to high electrical conductivity at high temperature.

Further, in the thin film layers 133 and 137, the thin film composition may further include a doping material. In one example, the thin film composition containing the doping material may generate heat at a second temperature, and the second temperature may be lower than the first temperature.

More specifically, the doping material may include at least one of metal ions such as Mo having a valence of +4 or more and W having a valence of +5 or more. More specifically, metal ions such as Mo having a valence of +4 or more, W having a valence of +5 or more, and Nb having a valence of +5 or more have the property of adjusting the phase transition temperature and/or the range of resistance change of the thin film composition. In one example, the doping material may include at least one of $Mo^{4+}$, $Mo^{5+}$, $Mo^{6+}$, $W^{5+}$, $W^{6+}$, and $Nb^{5+}$.

Thereby, in the battery module 100 according to the present embodiment, the doping material can be contained in the thin film composition constituting the thin film layers 133 and 137, so that heat generation temperature and the degree of resistance change of the thin film composition may be adjusted as necessary.

Next, a heat transfer path according to the thin film layers 133 and 137 in the battery module 100 according to the present embodiment will be described in detail.

FIG. 5 shows a heat transfer path when the end plate is removed from the battery module of FIG. 1.

As illustrated in FIG. 5, in the battery module 100 according to the present embodiment, heat inside the housing parts 300 and 400 may flow in the first direction D1 in a low-temperature environment. More specifically, the low-temperature environment may be an environment below the first temperature described above. Here, the first direction D1 may be described as a direction toward the battery cell stack 120 from the thin film layers 133 and 137. More specifically, in a low-temperature environment, heat generated in the thin film layers 133 and 137 can flow in the first direction D1 toward the battery cell stack 120 having a relatively low temperature.

In a room temperature or high temperature environment, the heat in the battery module 100 may flow in the second direction D2. Here, the second direction D2 may be described as a direction from the battery cell stack 120 toward the thin film layers 133 and 137. More specifically, in a room temperature or high temperature environment, the heat generated in the battery cell 110 during the charging and discharging process of the battery module 100 may flow in the second direction D2 toward the thin film layers 133 and 137 having a relatively low temperature.

Thereby, the battery module 100 according to the present embodiment can automatically switch the heat transfer path according to the temperature change of the external environment of the battery module 100. The manufacturing process is simple, and the manufacturing cost can also be reduced because no separate means is required. In addition, the temperature of the battery cell 110 may be maintained in a predetermined temperature range. That is, the thin film layers 133 and 137 may prevent a decrease in the output performance of the battery cell 110 in a low temperature environment. In addition, it functions as an electrical conductor in room temperature and high temperature environments, wherein the module cooling structure via the thermal conductive resin layer 310 on the bottom surface of the U-shaped frame 300 can function to prevent the ignition phenomenon of the battery cells 110.

A battery pack according to another embodiment of the present disclosure includes the battery module described above. Meanwhile, one or more battery modules according to the present embodiment can be packaged in a case to form a battery pack.

The above-mentioned battery module and the battery pack including the same can be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

The invention claimed is:

1. A battery module comprising:
   a battery cell stack comprising a plurality of battery cells;
   a housing for the battery cell stack;
   a pair of busbar frames that cover the front and rear surfaces of the battery cell stack; and
   a pair of end plates that cover the busbar frames and are coupled to the housing,
   wherein a busbar is mounted on each of the pair of busbar frames,
   wherein a thin film layer is located between each of the pair of busbar frames and the respective end plate,
   wherein the thin film layer comprises a thin film composition that generates heat at a first temperature,
   wherein the thin film layer functions as an electrical conductor at the first temperature or more, and
   wherein the thin film layer is coated on at least a part of a surface of the busbar.

2. The battery module of claim 1, wherein:
   the first temperature is a temperature of 10 degrees Celsius or less.

3. The battery module of claim 1, wherein:
   the thin film composition comprises a critical temperature resistor ceramic material.

4. The battery module of claim 3, wherein: the critical temperature resistor ceramic material comprises at least one of a composite vanadium oxide-based material, a boron oxide-based material, and a phosphoric acid-based material.

5. The battery module of claim 4, wherein:
   the composite vanadium oxide-based material is selected from at least one of $VO_2$, $V_2O_3$, and $V_6O_{13}$.

6. The battery module of claim 1, wherein:
   the thin film composition further comprises a doping material.

7. The battery module of claim 6, wherein:
   the doping material comprises at least one of $Mo^{4+}$, $Mo^{5+}$, $Mo^{6+}$, $W^{5+}$, $W^{6+}$, and $Nb^{5+}$.

8. The battery module of claim 7, wherein:
   the thin film composition comprising the doping material generates heat at a second temperature, and
   the second temperature is lower than the first temperature.

9. A battery pack comprising the battery module of claim 1.

* * * * *